I. R. UTTERBACK, W. C. SPRINGER, Jr. & W. L. GALBRAITH.
ATTACHMENT FOR TEA KETTLES.
APPLICATION FILED AUG. 9, 1911.
1,018,854.        Patented Feb. 27, 1912.
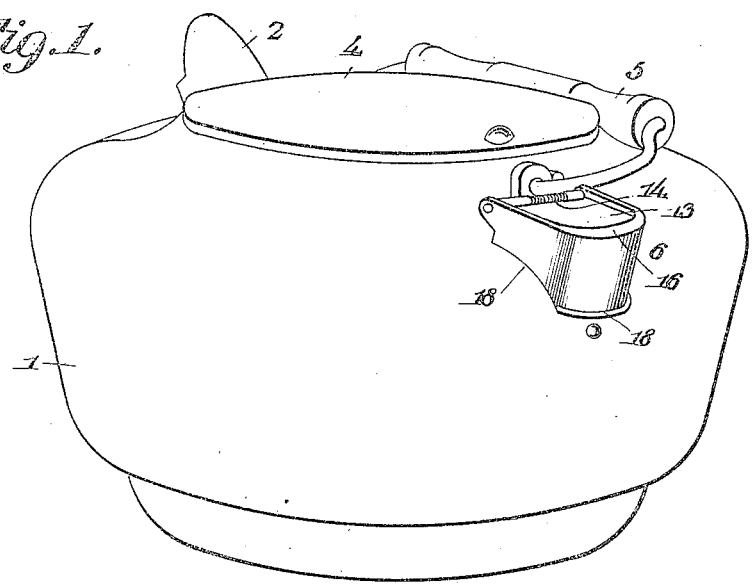
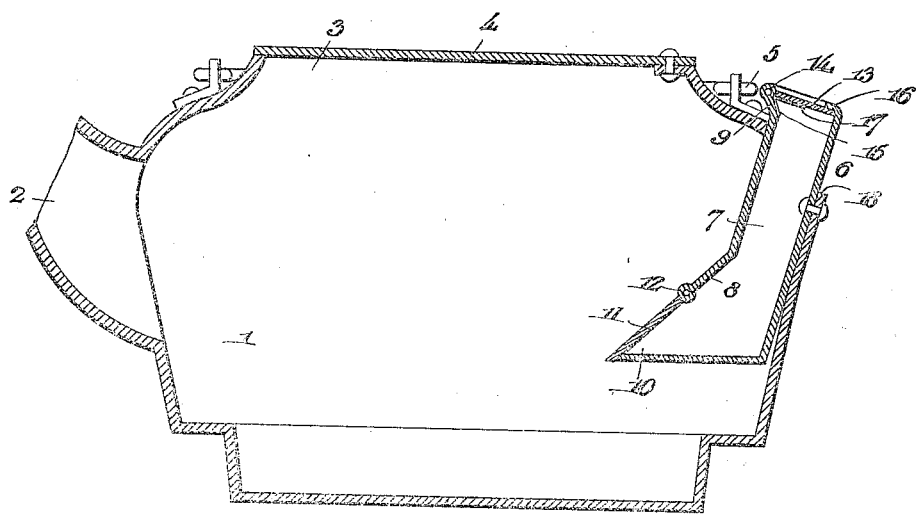

UNITED STATES PATENT OFFICE.

IVAL R. UTTERBACK, WILLIAM COLLINS SPRINGER, JR., AND WARREN LESLIE GALBRAITH, OF VANCOUVER, WASHINGTON.

ATTACHMENT FOR TEA-KETTLES.

1,018,854.  Specification of Letters Patent.  Patented Feb. 27, 1912.

Application filed August 9, 1911. Serial No. 643,103.

*To all whom it may concern:*

Be it known that we, IVAL R. UTTERBACK, WILLIAM COLLINS SPRINGER, Jr., and WARREN LESLIE GALBRAITH, citizens of the United States, residing at Vancouver, in the county of Clarke and State of Washington, have invented new and useful Improvements in Attachments for Tea-Kettles, of which the following is a specification.

This invention relates to attachments for tea kettles or like receptacles or utensils, and has for an object to provide an attachment which can be applied readily to any ordinary form of tea kettle and which will serve as means whereby the kettle can be conveniently filled with water without the necessity of removing the cover thereof and thereby avoiding the possibility of the scalding of one's hands during the act of filling the kettle.

In the drawing, forming a portion of this specification and in which like numerals of reference indicate similar parts in the several views: Figure 1 is a perspective view of the kettle showing our improved attachment applied thereto. Fig. 2 is a vertical section therethrough.

The kettle 1 as shown herein is of ordinary construction and is provided with the usual pouring mouth or nozzle 2, the top filling opening 3 and the cover 4. In addition to the above the kettle is provided with a lifting or carrying bail 5. Our improved filling attachment 6 is provided preferably with the vertical intermediate portion 7, the lower downwardly inclined portion 8 and the upper filling portion 9. The portion 8 extends into the kettle 1 and it is provided with an opening 10, the walls of which being inclined downwardly in the direction of the bottom of the kettle 1 so as to provide means whereby the valve or cover member 11 may gravitate to a closed position. The said valve or cover member by being inclined with relation to the bottom of the kettle is also such that it will be subjected to the full pressure of the steam in the kettle so as to positively prevent the escape of the steam by way of the opening 10. The valve or cover member 11 is hinged, at 12, to the inner wall of the portion 8. An inwardly opening valve or cover member 13 is hinged, at 14, to the inclined stop forming wall 15 of the upper portion of the attachment. The upper wall of the attachment is provided with a stop 16 against which the valve or cover member 13 normally bears under the action of the closing spring 17.

The kettle 1 as hereinbefore described is of the ordinary construction and to accommodate our attachment, the kettle has formed therein an opening 18 for the reception of the portion 8 of the attachment. The device is soldered or otherwise secured in any suitable well known manner to the kettle.

In using the device the handle 5 of the kettle is held in one hand of the user and the kettle positioned beneath a water supply faucet so that the closure or valve member 13 will be disposed beneath the passage. By moving the kettle upwardly the portion 13 may be brought in contact with the faucet so as to be opened thereby, after which the faucet may be opened to permit the water to discharge into the attachment. On the inflow of water into the attachment the weight of the water behind the valve or closure portion 11 will be sufficient to open the same to thereby permit the water to enter the kettle. This construction is such that the valves 11 and 13 respectively, are automatically closing, one gravitating and the other being controlled under the influence of the spring 17. This positively prevents the escape of the steam to the atmosphere.

We claim:

1. A vessel having pouring and filling orifices therein, a filling attachment having a portion extending through the filling orifice and disposed within the vessel and provided with an opening therein, an inwardly opening valve closing the said opening, the said attachment being provided at its outer end with an opening, a stop carried by the attachment and located at the outer open end thereof, and an inwardly opening valve closing the said second opening and provided with means for normally holding the same closed against the said stop.

2. A vessel having an opening therein, a filling attachment having an inner portion disposed in the opening and extending downwardly in the direction of the bottom of the vessel, an inwardly opening valve closing the said opening, the said attachment having a vertical portion extending upwardly against one side of the vessel, the said attachment having an upper open portion, a normally closed valve closing the said upper open portion, and stops positioned above and below the said second valve and operating to limit the open and closed adjustments of the same.

In testimony whereof we affix our signatures in presence of two witnesses.

IVAL R. UTTERBACK.
WILLIAM COLLINS SPRINGER, JR.
WARREN LESLIE GALBRAITH.

Witnesses:
H. C. MERRYMAN,
BERT YATES.